United States Patent

Bolz

(10) Patent No.: US 10,417,990 B2
(45) Date of Patent: Sep. 17, 2019

(54) EFFICIENT BINDING OF RESOURCE GROUPS IN A GRAPHICS APPLICATION PROGRAMMING INTERFACE

(71) Applicant: Nvidia Corporation, Santa Clara, CA (US)

(72) Inventor: Jeffrey A. Bolz, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 394 days.

(21) Appl. No.: 14/855,524

(22) Filed: Sep. 16, 2015

(65) Prior Publication Data

US 2016/0111059 A1 Apr. 21, 2016

Related U.S. Application Data

(60) Provisional application No. 62/064,847, filed on Oct. 16, 2014.

(51) Int. Cl.
*G09G 5/00* (2006.01)
*G06T 1/20* (2006.01)
*G09G 5/36* (2006.01)

(52) U.S. Cl.
CPC .............. *G09G 5/001* (2013.01); *G06T 1/20* (2013.01); *G09G 5/363* (2013.01); *G09G 2360/08* (2013.01); *G09G 2370/10* (2013.01)

(58) Field of Classification Search
CPC .................................. G06T 1/60; G09G 5/001
USPC ........................................................ 345/535
See application file for complete search history.

(56) References Cited

U.S. PATENT DOCUMENTS

| | | | | |
|---|---|---|---|---|
| 7,839,410 B1* | 11/2010 | Brown | ..................... | G06T 15/04 345/541 |
| 8,253,749 B1* | 8/2012 | Lichtenbelt | ........... | G06F 9/5033 345/502 |
| 2002/0033817 A1* | 3/2002 | Boyd | ..................... | G06T 15/005 345/419 |
| 2002/0070947 A1* | 6/2002 | Dorbie | ..................... | G06T 15/04 345/582 |
| 2008/0001952 A1* | 1/2008 | Srinivasan | ................ | G06T 1/20 345/502 |
| 2008/0180437 A1* | 7/2008 | Clark | ................... | G06F 11/3664 345/420 |
| 2011/0063318 A1* | 3/2011 | Bolz | ...................... | G06T 15/005 345/552 |
| 2011/0074802 A1* | 3/2011 | Nickolls | ................... | G06T 1/60 345/564 |
| 2011/0080407 A1* | 4/2011 | Duluk, Jr. | .............. | G06T 15/005 345/426 |
| 2011/0084972 A1* | 4/2011 | Duluk, Jr. | ................. | G06T 1/20 345/501 |
| 2014/0176586 A1* | 6/2014 | Gruber | ................ | G06F 12/0607 345/533 |

\* cited by examiner

*Primary Examiner* — Mark K Zimmerman
*Assistant Examiner* — Jonathan M Cofino

(57) ABSTRACT

A method of binding graphics resources is provided that includes: (1) identifying graphics resources for binding, (2) generating a bind group for the graphics resources, (3) organizing the bind group into a bind group memory using a bind group layout and (4) providing bind group control for processing of the bind group. A method of organizing graphics resources and a resource organizing unit are also provided.

19 Claims, 2 Drawing Sheets

EFFICIENT BINDING OF RESOURCE GROUPS IN A GRAPHICS APPLICATION PROGRAMMING INTERFACE

CROSS-REFERENCE TO RELATED APPLICATION

This application claims the benefit of U.S. Provisional Application Ser. No. 62/064,847, filed by Jeffrey Bolz on Oct. 16, 2014, entitled "Method for Efficiently Binding Groups of Resources in a Graphics API," commonly assigned with this application and incorporated herein by reference.

TECHNICAL FIELD

This application is directed, in general, to graphics processing and more specifically, to a method of binding graphics resources, a method of organizing graphics resources and a resource organizing unit.

BACKGROUND

Efficient selection of memory resources through use of a graphics application programming interface (API) often proves elusive in practice. Classically, this selection is addressed by use of "bindings" (e.g., texture or vertex array bindings), where an application provides one or more central processing unit pointers or names of resources. A driver then looks up one or more objects and retrieves data required to program appropriate hardware, which usually requires sending graphics processing unit commands or populating a table in memory with that data. This is generally done one "access type" at a time, where an access type may be a texture, an unordered access view (UAV) or a vertex array, for example. Problems with this approach include providing a major source of central processing unit bottlenecks in most applications and in a reusing of display lists or precompiled command buffers, since some subset of resources usually needs to change from frame to frame.

Other, more recent application programming interface designs have approached this differently with moderate success. In a use of descriptor objects, binding information is placed in descriptors that are used to represent the memory resources, which may be efficient if the descriptors are completely static in nature. However, this approach involves some very high operational costs when modification of these descriptors is required, or an application is forced to wait for all previous uses of the descriptors to complete before modifying them and updates require expensive memory mapping operations. Additionally, these application programming interfaces do not have a notion of access types, so all access types are bundled together.

Another approach exposes "heaps" of descriptors, somewhat organized by access type, and binding resources that select a range of a heap (called a "table"). These descriptor heaps are large and required to reside in a same memory where descriptors are stored, and an application has an additional operating cost or burden of providing copies of these large descriptors. For example, a descriptor for a texture may require 32 bytes consisting of a texture's graphics processing unit (GPU) address, dimensions, format and several other properties. A requirement of only binding a range of a heap also necessitates significant redundancy in writing descriptors in that a descriptor may need to be shared in multiple tables. This application programming interface also organizes functionality into several "tiers" or feature levels, where applications are required to use very different coding patterns to take advantage of each tier. What is needed in the art is an improved way to manage the application of graphics resources.

SUMMARY

One aspect provides a method of binding graphics resources. In one embodiment, the method includes: (1) identifying graphics resources for binding, (2) generating a bind group for the graphics resources, (3) organizing the bind group into a bind group memory using a bind group layout and (4) providing bind group control for processing of the bind group.

Another aspect provides a method of organizing graphics resources. In one embodiment, the method includes (1) identifying graphics resources for binding, (2) arranging the graphics resources into individual resource groups, (3) defining a resource group layout for each individual resource group, (4) defining a pipeline bind layout for a collection of the individual resource groups, (5) providing a pipeline bind command for subsequent processing of the collection of the individual resource groups and (6) providing a pipeline bind layout handle corresponding to the pipeline bind command for the subsequent processing of the collection of the individual resource groups.

Yet another aspect provides a resource organizing unit. In one embodiment, the unit includes (1) a resource memory having graphics resources for binding, (2) a resource manager coupled to the resource memory and configured to provide a bind group for the graphics resources and organize the bind group into a bind group memory using a bind group layout and (3) a resource controller coupled to the resource manager and configured to provide bind group control for processing of the bind groups. In another embodiment, the resource manager is further configured to provide a pipeline bind layout for a collection of the bind groups, and the resource controller is further configured to provide pipeline bind control for processing of the collection of the bind groups.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Embodiments of the present disclosure provide a mechanism to bind resources that satisfy several advantageous criteria. These include a capability that is straightforward and operationally efficient to write and modify sets of graphics resources. Also included is an ability to scale across multiple levels of hardware support, allowing the hardware to evolve toward bindless resource access in a way that is advantageous for existing applications. Additionally, resources may be grouped by their rate of change (e.g., allows an application to have "scene" vs. "material" vs. "object" groups of bindings that can be swapped without disturbing the others). Further included are resources that are efficient to submit on a central processing unit (CPU) to avoid an "explosion" of changes required for all groups (e.g., access types, shader stages, etc.).

Embodiments of the present disclosure employ a notion of a "bind group", where for example, a shader stage may employ at least four bind groups. A bind group is defined as a set of resources that an application describes in bind group memory (e.g., buffer memory) using a standardized layout. In one embodiment, the bind group employs a graphics processing unit (GPU) handle, which represents a GPU address of a regular "full-length" descriptor or an index of the regular descriptor within a heap. Additionally, an associated offset and length are included in the bind group memory.

Embodiments of the present disclosure also provide an "access-type awareness", which allows a graphics processing unit to use different hardware mechanisms to access each type most efficiently. This makes full-length descriptors accessible to a graphics processing unit and allows them to follow all conventional rules regarding hazards, synchronization and updates. The bind groups also offer an evolutionary path to efficient shader or bindless access of all access types.

Figures 1, 2:
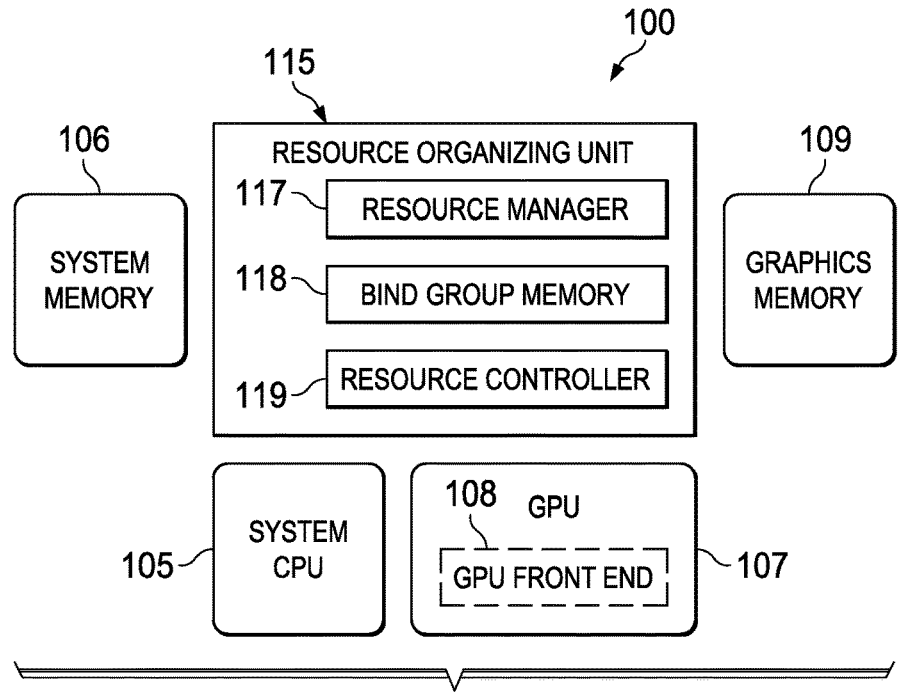
FIG. 1 illustrates an embodiment of a computer system constructed according to the principles of the present disclosure.
FIG. 2 illustrates an embodiment of a bind group memory constructed according to the principles of the present disclosure.

FIG. 1 illustrates an embodiment of a computer system, generally designated 100, constructed according to the principles of the present disclosure. The computer system 100 may typically accommodate a wide variety of computer application software including gaming applications.

The computer system 100 includes a system central processing unit (CPU) 105, a system memory 106, a graphics processing unit (GPU) 107 having a GPU front end 108 and a graphics memory 109. The computer system 100 also includes a resource organizing unit 115 having a resource manager 117, a bind group memory 118 and a resource controller 119.

The system CPU 105 is coupled to the system memory 106 and the GPU 107 to provide general computing processes and control of operations for the computer system 100. The system memory 106 includes long term memory storage (e.g., a hard drive or flash drive) for computer applications and random access memory (RAM) to facilitate computation by the system CPU 105. The GPU 107 is further coupled to the graphics memory 109 to provide graphics processing and frame control information. The resource organizing unit 115 is operationally coupled to each of the system CPU 105, the system memory 106, the GPU 107 and the graphics memory 109.

The resource organizing unit 115 is generally indicated in the computer system 100, and in one embodiment, is include in a software module that may correspond to software included with a computer application or software that is independent of the computer application. The resource organizing unit 115 may operationally reside in the system memory 106, the graphics memory 109 or in portions of both. The resource organizing unit 115 may alternately include a hardware portion or be totally implemented in hardware.

The resource organizing unit 115 employs a resource memory having graphics resources for binding. In the illustrated embodiment, the resource memory may correspond to the system memory 106, the graphics memory 109 or another memory not shown in FIG. 1, depending on an overall capability of the computer system 100. The resource manager 117 is coupled to the resource memory and configured to provide a bind group for the graphics resources and organize the bind group into the bind group memory 118 using a bind group layout. The bind group memory 118 may typically be a buffer memory. The resource controller 119 is coupled to the resource manager 117 and configured to provide bind group control for processing of the bind group.

In another embodiment, the resource manager 117 is further configured to provide a pipeline binding layout for a collection of the bind groups. Correspondingly, the resource controller 119 is further configured to provide pipeline binding control for processing of the collection of bind groups.

Embodiments of the present disclosure allow an application to directly write binding information into a bind group memory, which can be consumed directly by a GPU, such as the GPU 107. This offers different approaches to implementation, depending on equipment hardware capabilities.

Some hardware equipment may require passing a relatively large amount of state through the GPU front end 108 to setup a binding. Such an implementation may employ the system CPU 105 to read GPU handles, which is then used to lookup this state and push it in a corresponding command buffer. This approach is operationally expensive relatively, but allows use of less functionally capable hardware.

Other hardware may require passing state through the GPU front end 108, but in a way that requires only slight involvement from the system CPU 105. For example, employing method macro expansion (MME) and graphics processor first-in-first-out (GPFIFO) capabilities allows setting up vertex attribute pointers (where a GPU handle is just the GPU virtual address) or setting up texture header indices (where the GPU handle is defined to be the texture header index). In this mode, the system CPU 105 need not process the contents of the buffer memory and just sends the contents to the GPU FE 108 to be consumed, making CPU involvement relatively slight.

Yet other hardware allows bindless shader memory access to some or all access types. For example, some hardware can access texture header indices directly out of a constant buffer at full speed. In this mode, a compiler assigns constant buffer addresses in the shader code to match the group index of a resource, and the system CPU 105 can just bind a group buffer memory as a constant buffer for the shader to read directly. In this mode, there is little CPU involvement and much less involvement required of the GPU front end 109. This arrangement allows state changes to be operationally very attractive.

Even though all access types can be combined in a single bind group, the GPU 107 need not support a same "feature level" for all access types. However, it is envisioned that all GPU hardware would be able to use some combination of these operating modes.

Table 1 below, sets forth pseudocode for examples of access types and handles associated with corresponding bind groups that may be employed in the computer system 100. Access type is a class concept associated with embodiments of the present disclosure. Each of the access types includes a unique GPU handle wherein GPU handles may correspond to a GPU virtual address, a GPU descriptor table index or be purely a software structure, thereby allowing abstraction to span a wide variety of hardware.

TABLE 1

Pseudocode for Access Types and Handles

```
GetTextureSamplerHandle(tex, sampler, view state);
GetImageHandle(tex, view state);
GetRendertargetHandle(tex, view state);
GetVertexHandle(buf);
GetUniformHandle(buf);
```

Table 2 below, sets forth pseudocode for a shader source employing a standardized layout in a bind group memory. The shader source defines a bind group layout of a bind group by annotating input variables with group number and index (offset) within the bind group. The bind group may have any or all access types within it, although it may be advantageous to separate them within a bind group (i.e., no overlap of two access type indices in a same bind group). Allowing all access types in a bind group helps to minimize the number of bind groups needed and an operational cost to bind them. It may be seen in Table 2 that access types corresponding to uniform blocks, textures and shader storage buffer objects (SSBO) are employed in this example.

TABLE 2

Pseudocode for a Shader Source Employing a
Standardized Layout in a Bind Group Memory

```
// uniform blocks:
layout(group = 0, index = 0) uniform Type0 { ... } ubo0;
layout(group = 0, index = 1) uniform Type1 { ... } ubo1;
// textures:
layout(group = 0, index = 4) uniform sampler2D tex0;
// index 5 is not used
layout(group = 0, index = 6) uniform sampler2D tex1;
// SSBO:
layout(group = 0, index = 7) buffer Type2 { ... } ssbo0;
void main( ) {
    // ...
}
```

FIG. 2 illustrates an embodiment of a bind group memory, generally designated 200, constructed according to the principles of the present disclosure. The bind group memory 200 may generally be a buffer memory that includes one or more bind groups. The bind group memory 200 corresponds to a bind group layout of Table 2 and includes corresponding bind groups 205-225, as shown.

In this example, the bind group layout of the bind group memory 200 includes first and second words each consisting of eight bytes for a GPU handle, a third word consisting of four bytes for an offset designation and a fourth word consisting of four bytes for a length designation, where both correspond to the GPU handle.

As may be seen in Table 2 above, all of the declarations included have a same bind group number (group 0). Table 3 below, sets forth pseudocode allowing varying frequencies of change between bind groups and correspondingly provide the ability to be able to separately and independently bind groups of bindings or pipelines. Therefore, key characteristics of this embodiment of the disclosure are the ability to bind groups without disturbing a pipeline and bind the pipeline without disturbing the groups. This typically reduces a condition operationally where shaders or pipelines incur bindings that needed a high level of revalidation.

Table 3 indicates an application having three groups of bindings where the application organizes a rendering loop that may accommodate different frequencies of change. Here, an outer loop is looping over different render passes in a scene. There may only be one to a dozen render passes, and for each of these passes, there may be some set of global resources that apply to everything in the pass. For a higher frequency middle loop, there are different sets of materials that define what kinds of shading are required for a set of objects. There may be textures and buffers that correspond to those materials that are used for many objects. Then, an inner loop may be a loop over individual objects and might only be binding that which defines a geometry of the object and not actually changing its shading, for example. So, there are typically different frequencies of change that need to be reflected in how the application binds the resources. That is, different frequencies of change can be placed into separate groups.

A shader source may annotate each variable and indicate the group that it is a member of along with its offset in that group or its index in that group. Then, different groups can be bound independently and each group stored in its own bind group memory, if appropriate. These groups can be swapped out independently and potentially without disturbing the other groups.

TABLE 3

Pseudocode for Allowing Varying Frequencies
of Change Between Bind Groups

```
// Example app logic:
foreach (render pass) {
    // bind "global" resources
    CmdBindGroup(group=0, ...);
    foreach (material) {
        CmdBindPipeline(material pipeline handle)
        // bind per-material resources
        CmdBindGroup(group=1, ...);
        foreach (object) {
            // bind per-object resources and draw
            CmdBindGroup(group=2, ...);
            CmdDraw*(...);
        }
    }
}
```

Table 4 below, sets forth pseudocode for bind group layout and pipeline bind layout. Here, there are two objects shown, where the first object defines a bind group layout. The first line indicates that there are uniform buffers starting at slot 0 and there are two of them. The second line indicates that there are textures starting at slot 4 and there are three of them, and the third line indicates that there are SSBO buffers starting at slot 7 and there is one of them. These are bind group layouts (bgl) that define the layout of a single bind group.

The pipeline bind layout (pbl) defines the layout of all involved groups and hardware unit assignment for program compilation and bind command. In this example, there may be up to four groups and the pipeline bind layout has four slots where a bind group can be attached (they are numbered 0-3). Each of the layouts is defined, they are attached to the pipeline bind layout and the pipeline bind layout is compiled. At this compile step, a driver sees all of the group's layouts at once.

The driver makes decisions for how the slots in the bind groups map to the internal hardware resources and what registers have to be programmed to do the bindings. This object is built separately from the shaders and the pipeline itself and separately from the bind groups. This is a common object, the one object that informs the other objects of what their layouts are. A pipeline bind layout handle (pblh) may correspond to a pointer to a CPU data structure that defines the pipeline bind layout employing a collection of bind group layouts.

TABLE 4

Pseudocode for Bind Group Layout and Pipeline Bind Layout

```
BindGroupLayoutSetRange(bgl, stage, UNIFORM, 0, 2);
BindGroupLayoutSetRange(bgl, stage, TEXTURE, 4, 3);
BindGroupLayoutSetRange(bgl, stage, SSBO, 7, 1);
PipelineBindLayoutBindGroupLayout(pbl, 0, bgl);
PipelineBindLayoutCompile(pbl);
pblh = PipelineBindLayoutGetHandle(pbl);
```

Table 5 below, sets forth pseudocode for pipeline compatibility and provides another detail where Table 5 is similar to Table 3. The application is again organizing a rendering loop, the inner loops are binding higher numbered groups and the outer loops are binding lower numbered groups. Two pipeline bind layouts may be defined as "compatible" for group N if groups zero through N have identical layouts. This means that if a same layout is being used, group N can be bound without disturbing groups zero through N−1.

Only the higher numbered groups are being bound in the inner loops at higher frequency, so they are not disturbing the lower numbered groups. Two pipeline bind layouts have an identical layout for groups of the lower numbered groups. Another detail is that the CmdBindPipeline command, in the middle of Table 5, also does not disturb the bindings. Therefore, each of these bind commands and binding the pipeline do not disturb any of the other bindings. This typically provides more predictability and improved overall operation.

TABLE 5

Pseudocode for Pipeline Compatibility

```
// Example app logic:
foreach (render pass) {
  // bind "global" resources
  CmdBindGroup(group=0, pblh, ...);
  foreach (material) {
    CmdBindPipeline(material pipeline handle)
    // bind per-material resources
    CmdBindGroup(group=1, pblh, ...);
    foreach (object) {
      // bind per-object resources and draw
      CmdBindGroup(group=2, pblh, ...);
      CmdDraw*(...);
    }
  }
}
```

Figure 3:
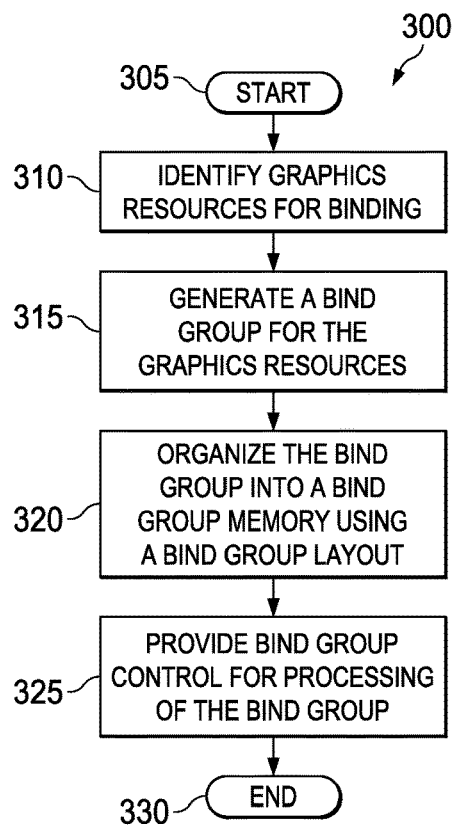
FIG. 3 illustrates a flow diagram of an embodiment of a method of binding graphics resources carried out according to the principles of the present disclosure.

FIG. 3 illustrates a flow diagram of an embodiment of a method of binding graphics resources, generally designated 300, carried out according to the principles of the present disclosure. The method 300 starts in a step 305 and graphics resources are identified for binding, in a step 310. Then, a bind group for the graphics resources is generated, in a step 315. The bind group is organized into a bind group memory using a bind group layout, in a step 320, and a bind group control for processing of the bind group is provided, in a step 325.

In one embodiment, the bind group includes a graphics processing unit handle having an offset designation and a length designation. In another embodiment, the graphics processing unit handle is selected from the group consisting of a uniform handle for a uniform buffer object, a texture handle for a texture object and a buffer handle for a shader storage buffer object. In still another embodiment, the bind group layout includes first and second words each consisting of eight bytes for the graphics processing unit handle, a third word consisting of four bytes for the offset designation and a fourth word consisting of four bytes for the length designation in the bind group memory.

In a further embodiment, the bind group control activates a shader source to directly reference the bind group memory bound as a constant buffer. In a still further embodiment, the bind group control activates a central processing unit to read from the bind group memory and write into a corresponding GPU command buffer. In yet another embodiment, the bind group control activates a graphics processing unit front end to splice contents of the bind group memory into a corresponding graphics processing unit command buffer. Correspondingly, the splicing of the contents of the bind group memory into a corresponding graphics processing unit command buffer provides for method macro expander conversion from the bind group layout into class methods. The method 300 ends in a step 330.

Figure 4:
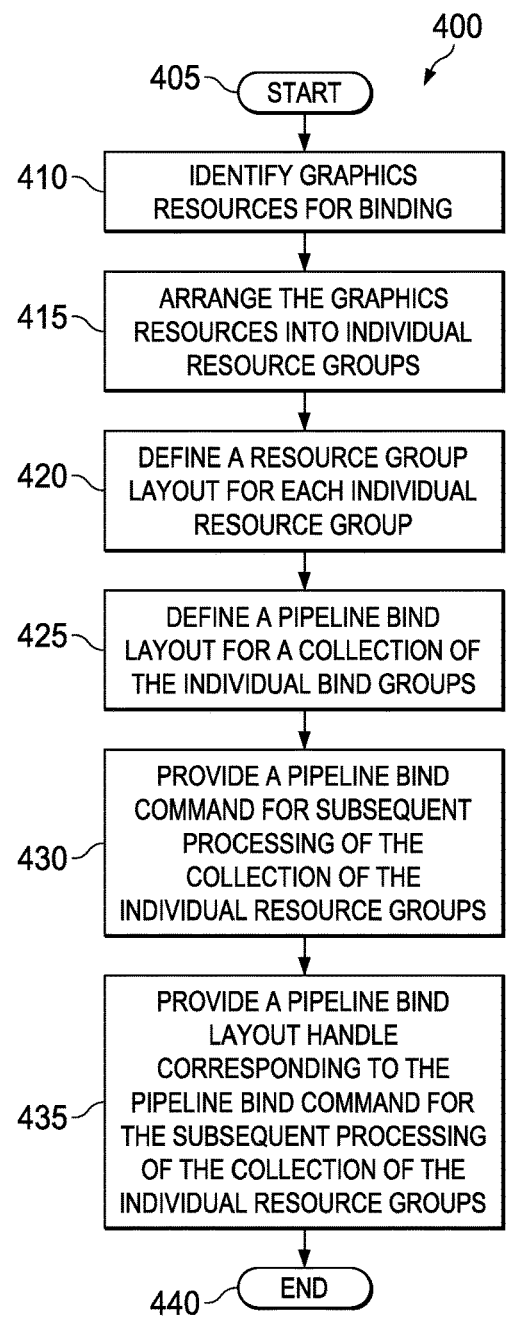
FIG. 4 illustrates a flow diagram of an embodiment of a method of organizing graphics resources carried out according to the principles of the present disclosure.

FIG. 4 illustrates a flow diagram of an embodiment of a method of organizing graphics resources, generally designated 400, carried out according to the principles of the present disclosure. The method 400 starts in a step 405 and graphics resources are identified for binding, in a step 410. Then, the graphics resources are arranged into individual resource groups, in a step 415. A resource group layout for each individual resource group is defined, in a step 420. A pipeline bind layout for a collection of the individual resource groups is defined, in a step 425. A pipeline bind command for subsequent processing of the collection of the individual bind groups is provided, in a step 430, and a pipeline bind layout handle corresponding to the pipeline bind command for the subsequent processing of the collection of the individual bind groups is provided, in a step 435.

In one embodiment, the pipeline bind layout indicates a hardware unit assignment for a program compilation and a bind command of an individual resource group. In another embodiment, the pipeline bind layout is based on a frequency of change of the individual resource groups. In yet another embodiment, the frequency of change of the individual resource groups includes varying frequencies of change for at least four individual resource groups.

In still another embodiment, the pipeline bind layout organizes the collection of individual resource groups selected from global resources, material resources or object resources. In yet another embodiment, the pipeline bind layout is organized to allow independent swapping of the individual resource groups. In a further embodiment, two pipeline bind layouts are compatible for an individual resource group N if individual resource groups zero through N have identical resource group layouts. The method 400 ends in a step 440.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A method of binding graphics resources, comprising:
identifying graphics resources for binding;
generating a bind group for the graphics resources;
organizing graphics processing unit (GPU) handles for descriptors of the graphics resources in the bind group into a bind group memory using a bind group layout; and
providing bind group control for processing of the bind group using the bind group layout.

2. The method as recited in claim 1 wherein the bind group control activates a shader source to directly reference the bind group memory bound as a constant buffer.

3. The method as recited in claim 1 wherein the bind group control activates a central processing unit to read from the bind group memory and write into a corresponding GPU command buffer.

4. The method as recited in claim 1 wherein the bind group control activates a graphics processing unit front end to splice contents of the bind group memory into a corresponding GPU command buffer.

5. The method as recited in claim 4 wherein the splicing of the contents of the bind group memory into a corresponding graphics processing unit command buffer provides for method macro expander conversion from the bind group layout into class methods.

6. The method as recited in claim 1 wherein the bind group includes one of the GPU handles and an offset designation and a length designation corresponding to the one of the GPU handles.

7. The method as recited in claim 6 wherein the GPU handles includes a uniform handle for a uniform buffer object, a texture handle for a texture object or a buffer handle for a shader storage buffer object.

8. The method as recited in claim 6 wherein the bind group layout includes first and second words each consisting of eight bytes for one of the GPU handles, third words each consisting of four bytes for one of the offset designations and fourth words each consisting of four bytes for one of the length designations in the bind group memory.

9. A method of organizing graphics resources, comprising:
identifying graphics resources for binding;
arranging the graphics resources into bind groups;
defining a bind group layout for each of the bind groups as a buffer memory range corresponding to an access type and a shader stage; and
defining a pipeline bind layout for a collection of the bind groups based on a frequency of change of the bind groups.

10. The method as recited in claim 9 wherein the pipeline bind layout indicates a hardware unit assignment for a program compilation and a bind command of the bind groups.

11. The method as recited in claim 9 wherein the frequency of change of the bind groups includes varying frequencies of change for at least four of the bind groups.

12. The method as recited in claim 9 wherein the pipeline bind layout organizes the collection of the bind groups selected from global resources, material resources or object resources.

13. The method as recited in claim 9 wherein the pipeline bind layout is organized to allow independent swapping of the bind groups.

14. The method as recited in claim 9 wherein two pipeline bind layouts are compatible for a bind group numbered N if bind groups numbered zero through N have identical bind group layouts.

15. The method as recited in claim 9 further comprising providing a pipeline bind command for subsequent processing of the collection of the bind groups.

16. The method as recited in claim 15 further comprising providing a pipeline bind layout handle corresponding to the pipeline bind command for the subsequent processing of the collection of the bind groups.

17. A resource organizer, comprising:
a resource memory having graphics resources for binding; and
a processor coupled to the resource memory and configured to provide a bind group for the graphics resources, organize graphics processing unit handles for descriptors of the graphics resources in the bind group into a bind group memory using a bind group layout, and provide bind group control for processing of the bind group using the bind group layout.

18. The resource organizer as recited in claim 17, wherein the processor is further configured to provide a pipeline bind layout for one or more of the bind group.

19. The resource organizer as recited in claim 17, wherein the processor is further configured to provide pipeline bind control for processing of one or more of the bind group.

* * * * *